(12) United States Patent
Du et al.

(10) Patent No.: US 10,761,395 B2
(45) Date of Patent: Sep. 1, 2020

(54) ELECTROPHORETIC DISPLAY

(71) Applicant: E Ink California, LLC, Fremont, CA (US)

(72) Inventors: Hui Du, Milpitas, CA (US); Peter Laxton, Alameda, CA (US); Yu Li, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 0 days.

(21) Appl. No.: 14/629,369

(22) Filed: Feb. 23, 2015

(65) Prior Publication Data

US 2015/0241754 A1     Aug. 27, 2015

Related U.S. Application Data

(60) Provisional application No. 61/943,926, filed on Feb. 24, 2014.

(51) Int. Cl.
| G02F 1/167  | (2019.01) |
| G02F 1/1676 | (2019.01) |
| G02F 1/1681 | (2019.01) |
| G02F 1/1675 | (2019.01) |

(52) U.S. Cl.
CPC ............ G02F 1/167 (2013.01); *G02F 1/1676* (2019.01); *G02F 1/1681* (2019.01); *G02F 2001/1678* (2013.01)

(58) Field of Classification Search
CPC ..... G02F 2001/1678; G02F 2001/1676; G02F 2001/1672; G02F 1/167; G02F 1/1676; G02F 1/1681

USPC .................................................. 359/296–300
See application file for complete search history.

(56) References Cited

U.S. PATENT DOCUMENTS

| 6,930,818 B1 | 8/2005 | Liang et al. |
| 7,046,228 B2 | 5/2006 | Liang et al. |
| 7,492,505 B2 | 2/2009 | Liang et al. |
| 8,115,729 B2 | 2/2012 | Danner et al. |
| 8,537,454 B2 | 9/2013 | Abe |
| 8,717,662 B2 | 5/2014 | Komatsu |
| 8,902,491 B2 | 12/2014 | Wang et al. |
| 2002/0180687 A1* | 12/2002 | Webber .................. G02F 1/167 345/107 |

(Continued)

FOREIGN PATENT DOCUMENTS

| JP | 2009025551 | 2/2009 |
| JP | 2011232397 | 11/2011 |

(Continued)

OTHER PUBLICATIONS

Gaurav Sharma, Digital Color Imaging Handbook, CRC Press, Taylor & Francis Group, 6000 Broken Sound Parkway NW, Suite 300, Boca Raton, FL. https://books.google.com/books?id=Ox1BqY67rI0C&printsec=frontcover#v=onepage&q&f=false.*

(Continued)

*Primary Examiner* — Stephone B Allen
*Assistant Examiner* — Rahman Abdur
(74) *Attorney, Agent, or Firm* — Ioannis Constantinides

(57) ABSTRACT

The present invention is directed to an electrophoretic display device comprising an electrophoretic fluid which fluid comprises two type of charged particles dispersed in a solvent, wherein the two types of charged particles are of the same color, but carrying opposite charge polarities.

16 Claims, 4 Drawing Sheets

Viewing Side

2(a)
Positive Driving Voltage
White

2(b)
Negative Driving Voltage
White

2(c)
No Driving Voltage
Blue (56) References Cited

U.S. PATENT DOCUMENTS

| | | | |
|---|---|---|---|
| 2005/0012980 | A1 | 1/2005 | Wilcox |
| 2010/0165448 | A1* | 7/2010 | Sprague ............... G02F 1/167 359/296 |
| 2011/0134508 | A1* | 6/2011 | Kawashima ........... G02F 1/167 359/296 |
| 2011/0261035 | A1 | 10/2011 | Miyazaki et al. |
| 2011/0297888 | A1* | 12/2011 | Farrand ................. C08L 33/12 252/501.1 |
| 2012/0307346 | A1* | 12/2012 | Sprague ............... G02F 1/167 359/296 |
| 2013/0077155 | A1* | 3/2013 | Wang .................... G02F 1/167 359/321 |
| 2013/0278995 | A1* | 10/2013 | Drzaic ................. B41J 3/4076 359/296 |
| 2014/0293398 | A1* | 10/2014 | Wang .................... G02F 1/167 359/296 |
| 2014/0340737 | A1* | 11/2014 | Sprague ............... G02F 1/167 359/296 |
| 2015/0092262 | A1 | 4/2015 | Greinert |
| 2017/0075184 | A1 | 3/2017 | Low |

FOREIGN PATENT DOCUMENTS

| | | |
|---|---|---|
| JP | 2013250384 | 12/2013 |
| WO | 1999053373 | 10/1999 |
| WO | WO 01/067170 | 9/2001 |
| WO | WO2014-019650 A1 | 2/2014 |

OTHER PUBLICATIONS

Sprague, R.A. (Sep. 23, 2009) SiPix Microcup Electrophoretic Epaper for Ebooks. *NIP* 25, 2009 pp. 460-462. (Presentation conducted on Sep. 23, 2009 at the 25th Int'l Conference on Digital Printing Technologies, Digital Fabrication 2009 (NIP 25) by Society for Imaging Science and Technology, in Louisville, Kentucky, USA.).

Zang, H.M., Wang, F., Kang, Y.M., Chen, Y. and Lin, W. (Jul. 2007) *Microcup® e-Paper for Embedded and Flexible Designs*. IDMC'07, Taipei International Convention Center, Taiwan.

Zang, H.M. (Feb. 2007) *Developments in Microcup® Flexible Displays*. Presentation conducted at the 6th Annual Flexible Display and Microelectronics Conference, Phoenix, AZ Feb. 6-8.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Zang, H.M. (Sep. 2006) *Monochrome and Area Color Microcup®EPDs by Roll-to-Roll Manufacturing Process*. Presentation conducted at the Fourth Organic Electronics Conference and Exhibition (OEC-06), Sep. 25-27, 2006, Frankfurt, Germany.

Wang, X., Zang, H.M. and Li, P. (Jun. 2006) Roll-to-Roll Manufacturing Process for Full Color Electrophoretic film. *SID Digest*, 00pp. 1587-1589.

Zang, H.M., Wang, W., Sun, C., Gu, H., and Chen, Y. (May 2006) Monochrome and Area Color Microcup® EPDs by Roll-to-Roll Manufacturing Processes. *ICIS' 06 International Congress of Imaging Science Final Program and Proceedings*, pp. 362-365.

Wang, X., Li, P., Sodhi, D., Xu, T.,Bruner, S and Hiraoka M. (Feb. 2006) *Inkjet Fabrication of Multi-Color Microcup® Electrophorectic Display*. The 5$^{th}$ Flexible Microelectronics & Displays Conference of U.S. Display Consortium ( Feb. 2006), Phoenix, Arizona.

Liang, R.C., (Feb. 2005) *Flexible and Roll-able Displays/Electronic Paper—A Brief Technology Overview*. Flexible Display Forum, 2005, Taiwan.

Zang, H.M. & Hou, Jack, (Feb. 2005) *Flexible Microcup® EPD by RTR Process*. Presentation conducted at 2$^{nd}$ Annual Paper-Like Displays Conference, Feb. 9-11, 2005, St. Pete Beach, Florida.

Ho, Candice. (Feb. 1, 2005) *Microcupt® Electronic Paper Device and Application*. Presentation conducted at USDC 4th Annual Flexible Display Conference 2005.

Bardsley, J.N. & Pinnel, M.R. (Nov. 2004) Microcup™ Electrophoretic Displays. *USDC Flexible Display Report*, 3.1.2. pp. 3-12-3-16.

Liang, R.C. (Oct. 2004) *Flexible and Roll-able Displays/Electronic Paper—A Technology Overview*. Paper presented at the METS 2004 Conference in Taipie, Taiwan.

Liang, R.C., Zang, H.M., Wang, X., Chung, J. & Lee, H., (Jun./Jul. 2004) « Format Flexible Microcup® Electronic Paper by Roll-to-Roll Manufacturing Process », Presentation conducted at the 14th FPD Manufacturing Technology EXPO & Conference.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Zang, H.M. (Feb. 2004). *Microcup Electronic Paper*. Presentation conducted at the Displays & Microelectronics Conference of U.S. Display Consortium, Phoenix, Arizona, USA.

Zang, H.M, Hwang, J.J., Gu, H., Hou, J., Weng, X., Chen, Y., et al. (Jan. 2004). Threshold and Grayscale Stability of Microcup® Electronic Paper. *Proceeding of SPIE-IS&T Electronic Imaging, SPIE* vol. 5289, 102-108.

Ho, C., & Liang, R.C. (Dec. 2003). *Microcup ® Electronic Paper by Roll-to-Roll Manufacturing Processes*. Presentation conducted at FEG, Nei-Li, Taiwan.

Chung, J., Hou, J., Wang, W., Chu, L.Y., Yao, W., & Liang, R.C. (Dec. 2003). Microcup® Electrophoretic Displays, Grayscale and Color Rendition. *IDW*, AMD2/EP1-2, 243-246.

Zang, H.M. (Oct. 2003). *Microcup ® Electronic Paper by Roll-to-Roll Manufacturing Processes*. Presentation conducted at the Advisory Board Meeting, Bowling Green State University, Ohio, USA.

Allen, K. (Oct. 2003). Electrophoretics Fulfilled. *Emerging Displays Review: Emerging Display Technologies, Monthly Report—Oct. 2003*, 9-14.

Kleper, M., Miller, P., Miller L. (Oct. 2003) An Investigation of the Emerging and Developing Technologies Related to the Generation Beyond Print-on-Paper. *Advanced Display Technologies*, Oct. 2003, pp. 13-15, Rochester Institute of Technology (R.I.T.).

Zang, H.M., & Liang, R.C. (2003) Microcup Electronic Paper by Roll-to-Roll Manufacturing Processes. *The Spectrum*, 16(2), 16-21.

Chen, S.M. (Jul. 2003) The Applications for the Revolutionary Electronic Paper Technology. *OPTO News & Letters*, 102, 37-41. (in Chinese, English abstract attached).

Lee, H., & Liang, R.C. (Jun. 2003) SiPix Microcup® Electronic Paper—An Introduction. *Advanced Display*, Issue 37, 4-9 (in Chinese, English abstract attached).

Liang, R.C., Hou, J., Chung, J., Wang, X., Pereira, C., & Chen, Y. (May 2003). Microcup® Active and Passive Matrix Electrophoretic Displays by a Roll-to-Roll Manufacturing Processes. *SID Digest*, vol. 34, Issue 1, pp. 838-841, 20.1.

Chen, S.M. (May 2003) The New Application and the Dynamics of Companies. *TRI*. 1-10. (In Chinese, English abstract attached).

Liang, R.C., Hou, J., Zang, H.M., Chung, J., & Tseng, S. (Feb. 2003). Microcup® Displays: Electronic Paper by Roll-to-Roll Manufacturing Processes. *Journal of the SID*, 11(4), 621-628.

Liang, R.C., Hou, J., Zang, H.M., & Chung, J. (Feb. 2003). *Passive Matrix Microcup® Electrophoretic Displays*. Paper presented at the IDMC, Taipei, Taiwan.

Liang, R.C., & Tseng, S. (Feb. 2003). *Microcup® LCD, A New Type of Dispersed LCD by a Roll-to-Roll Manufacturing Process*. Paper presented at the IDMC, Taipei, Taiwan.

(56) References Cited

OTHER PUBLICATIONS

Liang, R.C. (Feb. 2003) *Microcup® Electrophoretic and Liquid Crystal Displays by Roll-to-Roll Manufacturing Processes*. Presentation conducted at the Flexible Microelectronics & Displays Conference of U.S. Display Consortium, Phoenix, Arizona.

Liang, R.C., Hou, J., & Zang, H.M. (Dec. 2002) Microcup Electrophoretic Displays by Roll-to-Roll Manufacturing Processes. *IDW*, EP2-2, 1337-1340.

Nikkei Microdevices. (Dec. 2002) Newly-Developed Color Electronic Paper Promises—Unbeatable Production Efficiency. *Nikkei Microdevices*, p. 3. (in Japanese, with English translation).

Patent Cooperation Treaty, PCT/US2015/017130, PCT Notification of Transmittal of the International Search Report and the Written Opinion of the International Searching Authority, or the Declaration, dated May 14, 2015.

European Patent Office; EP Appl. No. 15752760.7; extended European Search Report; dated Oct. 9, 2017.

* cited by examiner

ELECTROPHORETIC DISPLAY

The present application claims the benefit of U.S. Provisional Application No. 61/943,926, filed Feb. 24, 2014, the content of which is incorporated herein by reference in its entirety.

FIELD OF THE INVENTION

The present invention is directed to an electrophoretic display device and an electrophoretic fluid for such a display device.

BACKGROUND OF THE INVENTION

An electrophoretic display (EPD) is a non-emissive device based on the electrophoresis phenomenon influencing charged pigment particles dispersed in a dielectric solvent. An EPD typically comprises a pair of spaced-apart plate-like electrodes. At least one of the electrode plates, typically on the viewing side, is transparent. An electrophoretic fluid composed of a dielectric solvent with charged pigment particles dispersed therein is enclosed between the two electrode plates.

An electrophoretic fluid may have one type of charged pigment particles dispersed in a solvent or solvent mixture of a contrasting color. In this case, when a voltage difference is imposed between the two electrode plates, the pigment particles migrate by attraction to the plate of polarity opposite that of the pigment particles. Thus, the color showing at the transparent plate may be either the color of the solvent or the color of the pigment particles. Reversal of plate polarity will cause the particles to migrate back to the opposite plate, thereby reversing the color.

Alternatively, an electrophoretic fluid may have two types of pigment particles of contrasting colors and carrying opposite charges, and the two types of pigment particles may be dispersed in a clear solvent or solvent mixture. In this case, when a voltage difference is imposed between the two electrode plates, the two types of pigment particles would move to the opposite ends. Thus one of the colors of the two types of the pigment particles would be seen at the viewing side.

An electrophoretic display typically exhibits bistability, which means that after charged particles in an electrophoretic fluid are driven to desired locations under an electric field, the charged particles would remain substantially unmoved after the electric field is turned off. In other words, when an image is displayed by driving charged particles to the intended locations, the image would remain unchanged even after the electric field is turned off.

DETAILED DESCRIPTION OF THE INVENTION

Figure 1:
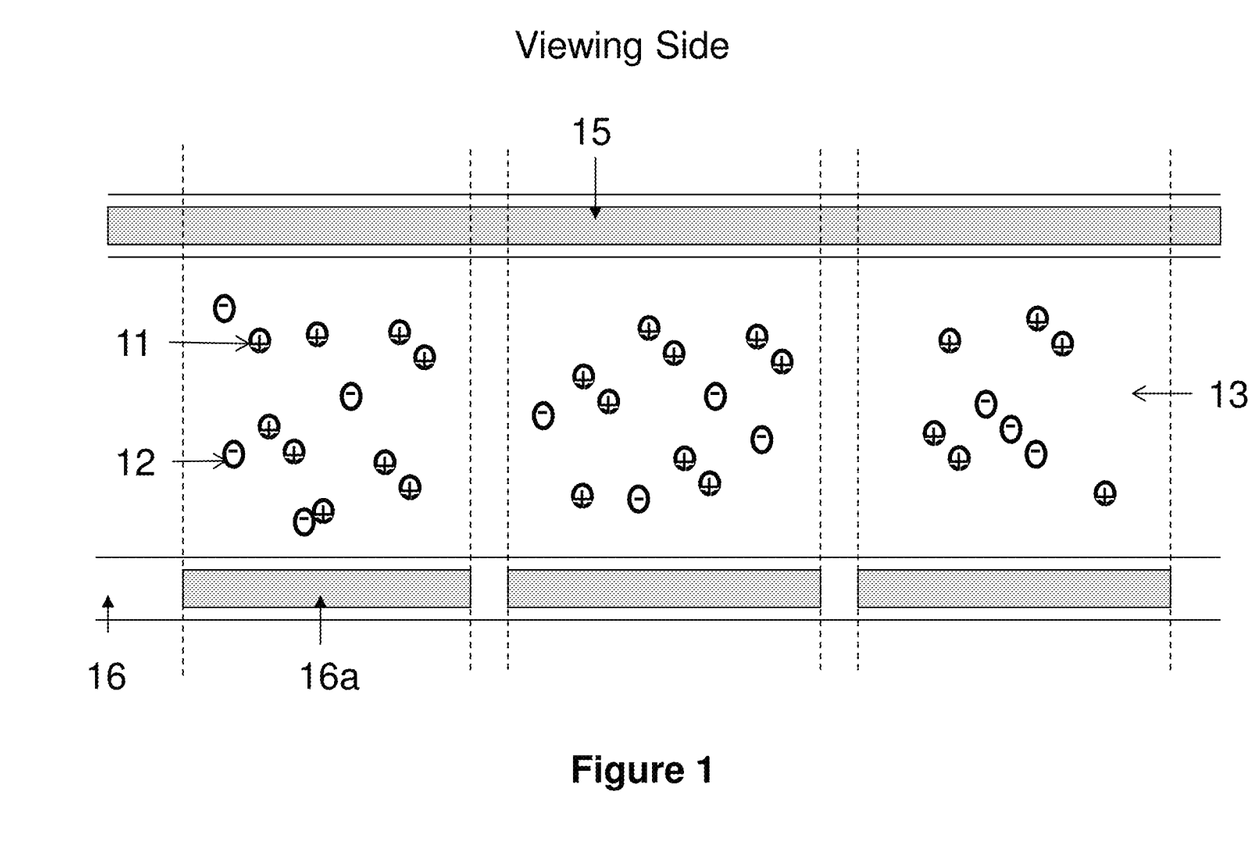
FIG. 1 illustrates an electrophoretic fluid of the present invention.

A first aspect of the present invention is directed to an electrophoretic fluid, as shown in FIG. 1.

In FIG. 1, a display device utilizes an electrophoretic fluid which comprises two types (11 and 12) of charged particles of the same color, but carrying opposite charge polarities. The two types of charged particles are dispersed in a solvent or solvent mixture (13) which has a color visually in contrast with the color of the two types of charged particles.

The display fluid is sandwiched between two electrode layers. One of the electrode layers is a common electrode (15) which is a transparent electrode layer (e.g., ITO), spreading over the entire top of the display device. The other electrode layer (16) is a layer of pixel electrodes (16a). The space between two dotted vertical lines represents a pixel. Therefore each pixel has a corresponding pixel electrode.

The pixel electrodes (16a) are described in U.S. Pat. No. 7,046,228, the content of which is incorporated herein by reference in its entirety. It is noted that while active matrix driving with a thin film transistor (TFT) backplane is mentioned for the layer of pixel electrodes, the scope of the present invention encompasses other types of electrode addressing as long as the electrodes serve the desired functions.

The concentration of the charged particles may be 1% to 20% by volume, preferably 5% to 10% by volume, in the display fluid.

If the charged particles are of a white color, they may be formed from an inorganic pigment such as $TiO_2$, $ZrO_2$, ZnO, $Al_2O_3$, $Sb_2O_3$, $BaSO_4$, $PbSO_4$ or the like. They may also be polymer particles with a high refractive index (>1.5) and of a certain size (>100 nm) to exhibit a white color.

For the black charged particles, they may be formed from CI pigment black 26 or 28 or the like (e.g., manganese ferrite black spinel or copper chromite black spinel) or carbon black.

If the charged particles are of other colors (non-white and non-black), they may be formed from organic pigments such as CI pigment PR 254, PR122, PR149, PG36, PG58, PG7, PB28, PB15:3, PY83, PY138, PY150, PY155 or PY20. Those are commonly used organic pigments described in color index handbooks, "New Pigment Application Technology" (CMC Publishing Co, Ltd, 1986) and "Printing Ink Technology" (CMC Publishing Co, Ltd, 1984). Specific examples include Clariant Hostaperm Red D3G 70-EDS, Hostaperm Pink E-EDS, PV fast red D3G, Hostaperm red D3G 70, Hostaperm Blue B2G-EDS, Hostaperm Yellow H4G-EDS, Novoperm Yellow HR-70-EDS, Hostaperm Green GNX, BASF Irgazine red L 3630, Cinquasia Red L 4100 HD, and Irgazin Red L 3660 HD; Sun Chemical phthalocyanine blue, phthalocyanine green, diarylide yellow or diarylide AAOT yellow. Color particles can also be formed from inorganic pigments, such as CI pigment blue 28, CI pigment green 50, CI pigment yellow 227, and the like.

The surface of the charged particles may be modified by known techniques based on the charge polarity and charge level of the particles required, as described in U.S. Pat. Nos. 6,822,782 and 7,002,728, US Publication Nos. 2014-0011913, US 2012-0199798, and US 2013-0175479, the contents of all of which are incorporated herein by reference in their entirety.

The charged particles may exhibit a native charge, or may be charged explicitly using a charge control agent, or may acquire a charge when suspended in a solvent or solvent mixture.

Suitable charge control agents are well known in the art; they may be polymeric or non-polymeric in nature or may be ionic or non-ionic. Examples of charge control agent may include, but are not limited to, Solsperse 17000 (active polymeric dispersant), Solsperse 9000 (active polymeric dispersant), OLOA 11000 (succinimide ashless dispersant), Unithox 750 (ethoxylates), Span 85 (sorbitan trioleate), Petronate L (sodium sulfonate), Alcolec LV30 (soy lecithin), Petrostep B100 (petroleum sulfonate) or B70 (barium sulfonate), Aerosol OT, polyisobutylene derivatives or poly (ethylene co-butylene) derivatives, and the like.

The solvent in which the pigment particles are dispersed has a dielectric constant in the range of about 2 to about 30, preferably about 2 to about 15 for high particle mobility. Examples of suitable dielectric solvent include hydrocarbons such as isopar, decahydronaphthalene (DECALIN), 5-ethylidene-2-norbornene, fatty oils, paraffin oil; silicon fluids; aromatic hydrocarbons such as toluene, xylene, phenylxylylethane, dodecylbenzene and alkylnaphthalene; halogenated solvents such as perfluorodecalin, perfluorotoluene, perfluoroxylene, dichlorobenzotrifluoride, 3,4,5-trichlorobenzotri fluoride, chloropentafluoro-benzene, dichlorononane, pentachlorobenzene; and perfluorinated solvents such as FC-43, FC-70 and FC-5060 from 3M Company, St. Paul Minn., low molecular weight halogen containing polymers such as poly(perfluoropropylene oxide) from TCI America, Portland, Oreg., poly(chlorotrifluoroethylene) such as Halocarbon Oils from Halocarbon Product Corp., River Edge, N.J., perfluoropolyalkylether such as Galden from Ausimont or Krytox Oils and Greases K-Fluid Series from DuPont, Del., polydimethylsiloxane based silicone oil from Dow-corning (DC-200).

The color of a solvent may be generated by dissolving a dye in the solvent. Solvent dyes are generally commercially available. The molecules of dyes for organic solvents are typically non-polar or of a low polarity, and they do not undergo ionization. The preferred dyes have good light fastness (e.g., metal complex based). Examples of commercially available solvent dyes may include, but are not limited to, Solvent Red 24, Solvent Red 26, Solvent Red 164, Solvent Yellow 124 or Solvent Blue 35.

One of the unique features of the display of the present invention is that, unlike traditional electrophoretic displays, the charged particles in the present invention exhibit no or minimum bistability, which means that when a driving voltage is turned off, the particles would move away from the positions where they have been driven to by a driving voltage.

Figure 2:
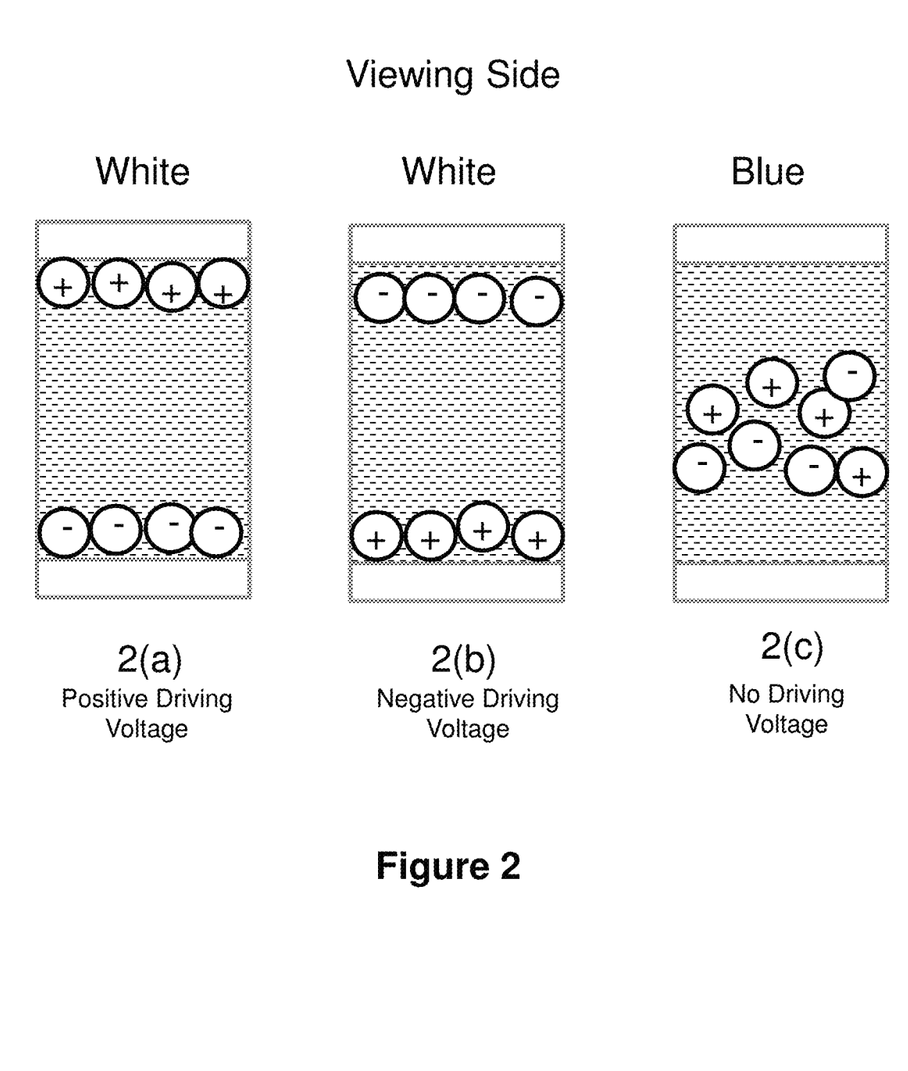
FIG. 2 illustrates how different color states may be displayed by a display device of FIG. 1.

FIG. 2 illustrates how different color states are displayed with the display of FIG. 1. It is assumed, for illustration purpose, both the positively charged and negatively charged particles are of the white color and they are dispersed in a solvent of a blue color.

When a positive driving voltage is applied to a pixel (see 2(a)), the positively charged white pigment particles are driven to be at or near the common electrode. As a result, a white color is seen at the viewing side.

When a negative driving voltage is applied to a pixel (see 2(b)), the negatively charged white pigment particles are driven to be at or near the common electrode. As a result, the color seen at the viewing side is also the white color.

When the driving voltage applied to the pixel of 2(a) or 2(b) is turned off, the charged white particles, due to lack of bistability, would move away from the common electrode. In this case, the color of the solvent (i.e., blue) is seen at the viewing side (see 2(c)).

From a pixel standpoint, a pixel displays the same optical state regardless of whether a positive or negative driving voltage is applied, and a different optical state is displayed when the driving voltage is turned off.

More specifically, when there is an electric field generated by a positive driving voltage, which is sufficient to drive the positively charged particles to reach the common electrode side to allow the color of the particles to be seen at the viewing side, such a state is referred to as an "on" state. Likewise, when there is an electric field generated by a negative driving voltage, which is sufficient to drive the negatively charged particles to reach the common electrode side to allow the color of the particles to be seen at the viewing side, this state is also referred to as the "on state". As stated above, because the two types of particles are of the same color, the colors displayed at both "on" states are the same.

When the power is off (that is, no driving voltage is applied), the state is referred to as an "off" state. At the "off" state, a different color is displayed (that is, seen at the viewing side).

According to the present invention, due to the lack of bistability, the color change between the "on" and "off" states, defined as $\Delta E$, is at least 5, preferably at least 10.

In color science, L, a, and b are used to define an optical state. A Lab color space is a color-opponent space with dimension L for lightness, and a and b for the color-opponent dimensions, based on nonlinearly compressed (e.g. CIE XYZ color space) coordinates. The lightness, $L^*$, represents the darkest black at $L^*=0$, and the brightest white at $L^*=100$. The color channels, $a^*$ and $b^*$, will represent true neutral gray values at $a^*=0$ and $b^*=0$. The red/green opponent colors are represented along the $a^*$ axis, with green at negative $a^*$ values and red at positive $a^*$ values. The yellow/blue opponent colors are represented along the $b^*$ axis, with blue at negative $b^*$ values and yellow at positive $b^*$ values. The scaling and limits of the $b^*$ and $b^*$ axes will depend on the specific implementation of Lab color, but they often run in the range of ±100 or −128 to +127. Every perceivable color has a set of $L^*$, $a^*$ and $b^*$ values.

If two color states are expressed as $(L_1^*, a_1^*, b_1^*)$ and $(L_2^*, a_2^*, b_2^*)$, respectively, then the color difference between the two color states, $\Delta E$, can be obtained from the following equation:

$$\Delta E = \sqrt{(L_2^*-L_1^*)^2+(a_2^*-a_1^*)^2+(b_2^*-b_1^*)^2}$$

For example, if at an "on" state, a pixel displays a white color, expressed in the Lab system as (65, −3.3, −1.8) and at the "off" state, the pixel displays a blue color, expressed as (32.6, −11.4, −34.5). In this example, the $\Delta E$ is calculated to be 46.7.

Figure 3:
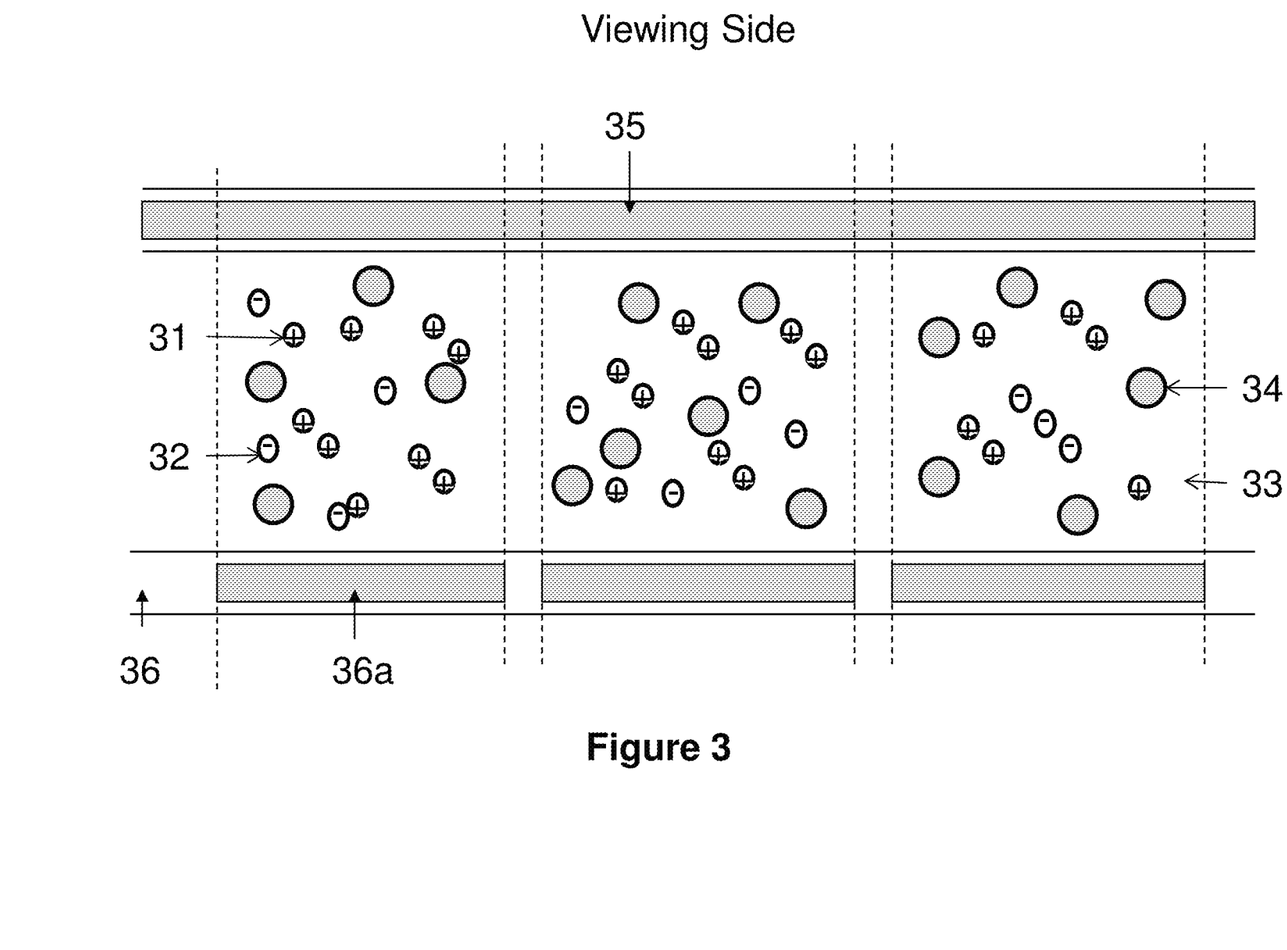
FIG. 3 illustrates an alternative electrophoretic fluid.

FIG. 3 illustrates a second aspect of the present invention. In this figure, an electrophoretic fluid comprises two types (31 and 32) of charged particles of the same color, but carrying opposite charge polarities. The two types of charged particles are dispersed in a solvent or solvent mixture (33) which may be clear and colorless. The display fluid is sandwiched between two electrode layers. One of the electrode layers is a common electrode (35) which is a transparent electrode layer (e.g., ITO), spreading over the entire top of the display device. The other electrode layer (36) is a layer of pixel electrodes (36a). The space between two dotted vertical lines represents a pixel. Therefore each pixel corresponds to a pixel electrode.

The descriptions above of the first aspect of the present invention are applicable to this aspect of the invention. However, in this aspect of the invention, a third type of particles (34) is added and the third type of particles is uncharged or slightly charged, and of a color which is visually in contrast with the color of the two types of charged particles. The solvent (33) in which the particles are dispersed preferably is clear and colorless.

The uncharged or slightly charged color particles may have a zeta potential of <20 mV. Therefore they will remain stationary and substantially uniformly dispersed in the display fluid, during operation of the display device.

The uncharged or slightly charged particles may be formed from a polymeric material. The polymeric material may be a copolymer or a homopolymer.

Examples of the polymeric material for the uncharged or slightly charged particles may include, but are not limited to, polyacrylate, polymethacrylate, polystyrene, polyaniline, polypyrrole, polyphenol, polysiloxane or the like. More specific examples of the polymeric material may include, but are not limited to, poly(pentabromophenyl methacrylate), poly(2-vinylnapthalene), poly(naphthyl methacrylate), poly(alpha-methystyrene), poly(N-benzyl methacrylamide) or poly(benzyl methacrylate).

In one embodiment, if the uncharged or slightly charged particles are colored, they may include, but are not limited to, commercially available colorants used in the LCD industry for color filter applications, such as Clariant's Hostaperm Red D2B-COF VP 3781 (i.e., red 254) which is in the class of diketopyrrolopyrrole, Hostaperm Blue E3R-COF VP3573 (i.e., blue 15:6) which is in the class of phthalocyanine, or Hostaperm Violet RL-COF O2 VP3101 (i.e., violet 23) which is in the class of dioxazine.

In another embodiment, the uncharged or slightly charged colored particles may have a transparent polymeric matrix and with dye molecules solubilized in the matrix. Examples of this type of uncharged or slightly charged colored particles may include, but are not limited to, dyed polymeric microparticles and dyed polystyrene particles all of which are commercially available.

The size of the uncharged or slightly charged particles is preferably in the range of 10 nanometers to 5 microns, more preferably 50 nanometers to 2 microns.

The concentration of the charged particles in FIG. 3 may be 1% to 20% by volume, preferably 5% to 10% by volume, in the display fluid and the concentration of the uncharged or slightly charged particles may be 1% to 30% by volume, preferably 7% to 20%, in the display fluid.

Figure 4:
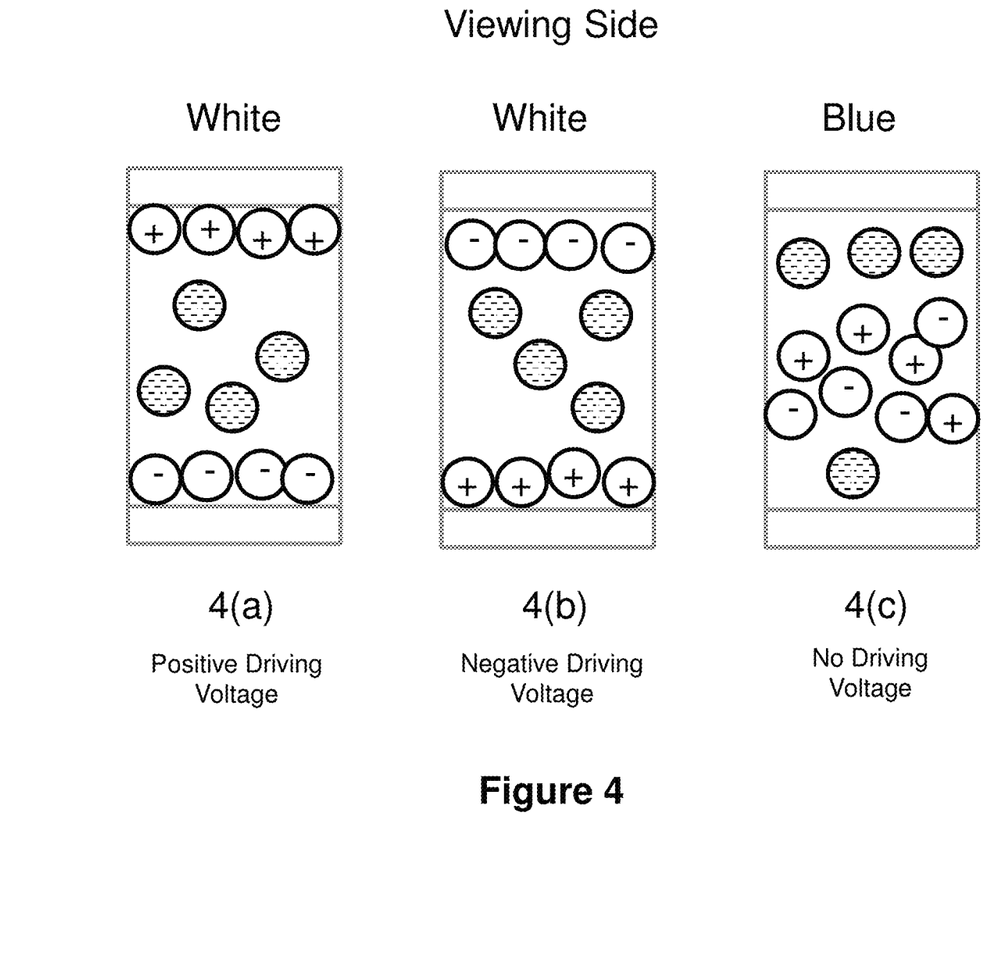
FIG. 4 illustrates how different color states may be displayed by a display device of FIG. 3.

FIG. 4 illustrates how different color states are displayed with the display fluid of FIG. 3. It is assumed, for illustration purpose, both the positively charged and negatively charged particles are of the white color and the third type of pigment particles are uncharged or slightly charged and of a blue color. The solvent, in this example, is clear and colorless.

When a positive driving voltage is applied to a pixel (see 4(*a*)), the positively charged white pigment particles are driven to be at or near the common electrode. As a result, a white color is seen at the viewing side.

When a negative driving voltage is applied to a pixel (see 4(*b*)), the negatively charged white pigment particles are driven to be at or near the common electrode. As a result, the color seen is also the white color.

When the driving voltage applied to the pixel of 4(*a*) or 4(*b*) is turned off, the charged white particles, due to lack of bistability, would move away from the common electrode. In this case, the color (i.e., blue) of the uncharged or slightly charged particles is seen at the viewing side (see 4(*c*)).

As shown in FIG. 4, a pixel displays the same optical state regardless of whether a positive or negative driving voltage is applied, and a different optical state is displayed when the driving voltage is turned off. According to the present invention, the color change between the "on" and "off" states, defined as ΔE, is also at least 5, preferably at least 10.

There are many different ways to reduce/eliminate bistability of charged particles in order to achieve the ΔE being at least 5, preferably being at least 10. The following are a few options.

For example, the higher ΔE may be achieved by surface modification of the charged particles. In one embodiment, the particles may be coated with a solvent-soluble polymer to cause the particles to be compatible with the solvent in which they are dispersed.

In general, the presence of the solvent-soluble polymer on the particle surface is key to achieve good dispersability of the particles. Selection of the solvent-soluble polymer would depend on the compatibility of the material with the solvent used in an electrophoretic fluid. Suitable polymers may include, but are not limited to, polyethylene, polypropylene, polyacrylate, or polysiloxane.

The solvent-soluble polymers may be formed from the monomers, oligomers or polymers, and they may have a single chain or a branched chain. They may also have different configurations, such as coils, stretched chains or irregular tangled chains on the particle surface, depending on compatibility of the polymer with the solvent in which the particles are dispersed and/or the density and length of the polymer chains.

On the surface of the particles, there may be only one single type of the solvent-soluble polymer or several different types of solvent-soluble polymer.

One example is $TiO_2$ as core pigment, surface coated with polylauryl acrylate. Other suitable monomers forming the solvent-soluble polymers may include, but are not limited to, lauryl methacrylate, 2-ethylhexyl acrylate, 2-ethylhexyl methacrylate, hexyl acrylate, hexyl methacrylate, n-octyl acrylate, n-octyl methacrylate, n-octadecyl acrylate or n-octadecyl methacrylate.

If the charged particles are surface coated with a solvent-soluble polymer, and when a driving voltage is turned off, the particles would tend to move away from the locations where they were driven to, and be dispersed back into the solvent.

Alternatively, the size of the charged particles is preferably relatively large, for example, larger than 1 micron. The density of the charged particles is also preferably high, for example, at least twice as high as the density of the solvent in which the particles are dispersed.

The fluid may also be designed to have a low shear viscosity in the range of 0.5 to 50 cps, at room temperature, so that the charged particles may be easily settle downwards due to gravity or uniformly dispersed by Brownian movement, when the power is off.

Further alternatively, a dielectric coating may be applied to the surface of the common electrode (which is on the viewing side) to cause the common electrode to have a remnant voltage (similar to the reverse bias phenomenon) which can push back the particles from the common electrode when the power is off. The dielectric coating may be polyurethane, polyacrylate, polyvinylalcohol, polyvinylacetate, epoxy or the like.

The electrophoretic fluid of the present invention is filled in display cells. The display cells may be cup-like microcells as described in U.S. Pat. No. 6,930,818, the content of which is incorporated herein by reference in its entirety. The display cells may also be other types of micro-containers, such as microcapsules, micro-channels or equivalents, regardless of their shapes or sizes. All of these are within the scope of the present application.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective and scope of the present invention. All such modifications are intended to be within the scope of the claims appended hereto.

What is claimed is:

1. An electrophoretic display comprising a plurality of pixels and an electrophoretic fluid which comprises two types of charged particles that exhibit no or minimum bistability, which are dispersed in a colored solvent, wherein
   a) the two types of charged particles are of the same color, but carry opposite charge polarities, such that application of driving voltage of either polarity across the electrophoretic fluid, will cause the pixel to have the color of the charged particles, which is an "on" state of the pixel;
   b) the colored solvent has a color which is visually distinguishable from the color of the charged particles, such that turning off the driving voltage from the "on" state, will cause the color of the pixel to be the color of the colored solvent; and
   c) the color difference of a pixel between the "on" state and the state established after turning off the driving voltage from the "on" state, expressed in $\Delta E$, is at least 5;
   wherein $\Delta E = \sqrt{(L^*_2 - L^*_1)^2 + (a^*_2 - a^*_1)^2 + (b^*_2 - b^*_1)^2}$, $L^*_1$, $a^*_1$, $b^*_1$ and $L^*_2$, $a^*_2$, $b^*_2$ are color coordinates for the colors of the "on" state of the pixel and state of the pixel established after turning off the driving voltage from the "on" state as defined by the CIE XYZ color space.

2. The display of claim 1, wherein $\Delta E$ is at least 10.

3. The display of claim 1, wherein the fluid further comprises a charge control agent.

4. The display of claim 1, wherein the charged particles are of a white color and the solvent is dyed red, green or blue.

5. The display of claim 1, wherein the charged particles are coated with a solvent-soluble polymer.

6. The display of claim 1, wherein the fluid is sandwiched between a common electrode and a plurality of pixel electrodes and the common electrode has a dielectric coating.

7. The display of claim 1, wherein the density of the charged particles is at least twice as high as the density of the solvent in which the particles are dispersed.

8. The display of claim 1, wherein the fluid has a low shear viscosity in the range of 0.5 to 50 cps, at room temperature.

9. The display of claim 1, wherein the size of the charged particles is larger than 1 micron.

10. The display of claim 1, wherein the fluid is filled in display cells.

11. The display of claim 10, wherein the display cells are cup-like microcells.

12. The display of claim 10, wherein the display cells are microcapsules.

13. The display of claim 1, wherein the fluid further comprises uncharged or slightly charged particles which have a color visually distinguishable from the color of the charged particles.

14. The display of claim 13, wherein the solvent is clear and colorless.

15. The display of claim 13, wherein the fluid further comprises a charge control agent.

16. The display of claim 13, wherein the charged particles are of a white color and the uncharged or slightly charged particles are red, green or blue.

* * * * *